(No Model.)
M. MEYER.
THERMOMETRIC INDICATOR.
No. 409,996. Patented Aug. 27, 1889.
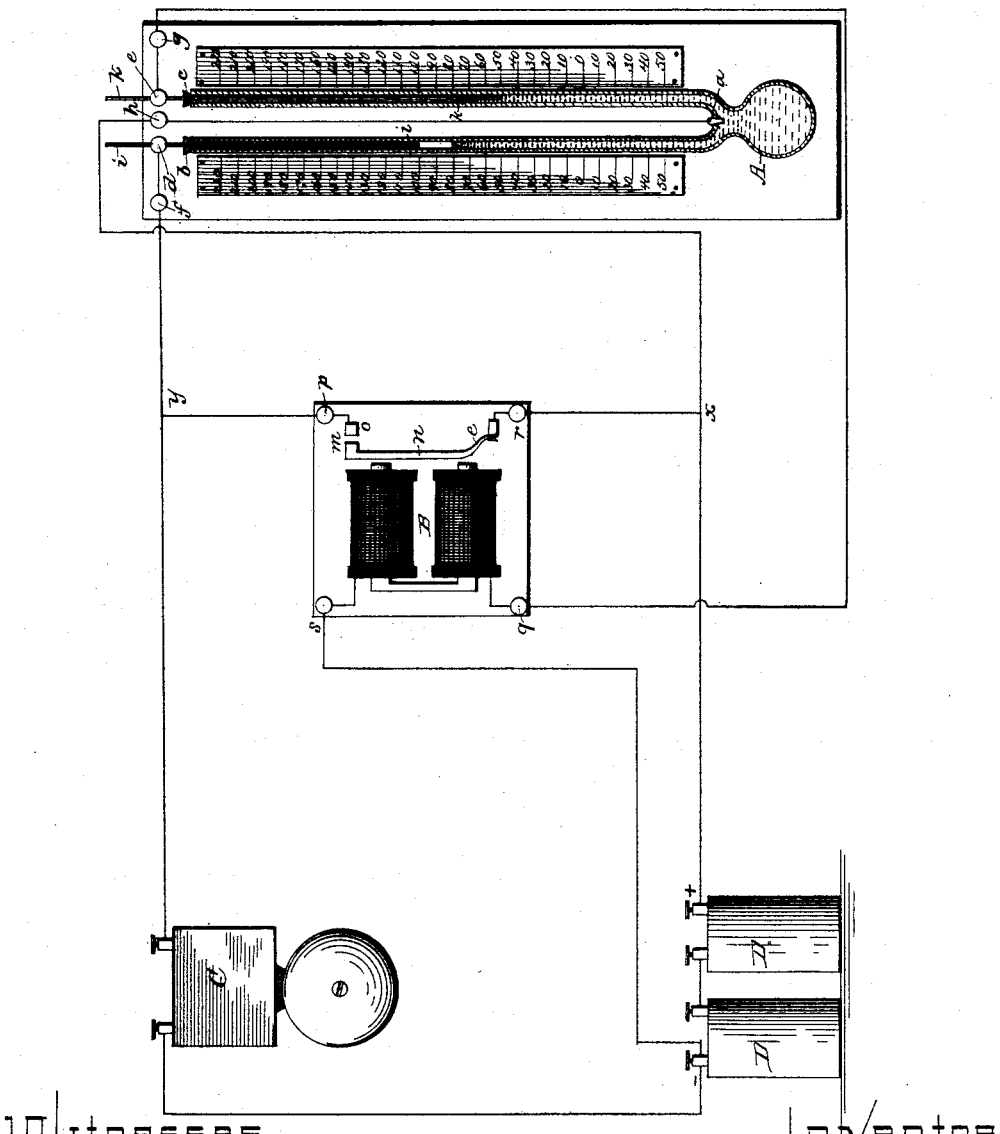
Witnesses
Inventor
Max Meyer

UNITED STATES PATENT OFFICE.

MAX MEYER, OF NEW YORK, N. Y., ASSIGNOR TO RUBEN B. AYRES, OF SAME PLACE.

THERMOMETRIC INDICATOR.

SPECIFICATION forming part of Letters Patent No. 409,996, dated August 27, 1889.

Application filed September 21, 1888. Serial No. 285,999. (No model.)

*To all whom it may concern:*

Be it known that I, MAX MEYER, of the city, county, and State of New York, have invented certain new and useful Improvements in Electrical Thermometric Alarms or Indicators, of which the following is a specification.

My invention is designed to furnish an efficient and simple means of indicating or announcing when either the maximum or the minimum of the two points between which it is desired to maintain the temperature has been attained.

The invention is adapted for use in green-houses and other places where a certain range of temperature must be maintained. It involves the use of a thermometer which is provided with two adjustable contacts, the one for the maximum and the other for the minimum point, in connection with what may be termed a "fixed contact" common to the two adjustable contacts, together with an annunciator or alarm, an electro-magnet, and circuit-connections, whereby whenever the mercury reaches either the maximum or the minimum point to which the thermometer may be adjusted the circuit will be completed through the annunciator or alarm, which otherwise is cut out and inactive. Each adjustable contact controls a separate circuit. The maximum contact controls what may be termed the "maximum circuit," a normally-open circuit in which the annunciator is included, and which remains open until the maximum point is reached, and the minimum contact controls what may be termed the "minimum circuit," a normally closed circuit including a neutral relay controlling contact-points in a branch circuit from the battery in which the annunciator or alarm is contained, the relay being energized, and consequently holding the contact-points of the annunciator branch circuit open until the minimum circuit is broken, which takes place when the mercury in the thermometer falls below the minimum point.

The accompanying drawing represents the apparatus and circuit-connections embodying my invention.

The thermometer consists of a glass bulb A, filled with mercury, and having connected with it two upright parallel similar tubes, the whole fixed upon a suitable board or frame, and each tube provided with the usual thermometric scale, as shown. The mercury is at the same level in both tubes.

Permanently inserted in the bulb A, and in electric connection with the mercury therein, is a platinum wire $a$, connected electrically to an external binding-post $h$. The upper ends of the thermometric tubes are closed by stoppers $b$ $c$, through which pass platinum wires $i$ $k$, which can be adjusted up and down, and are adjustably held at their outer ends in the binding-posts $d$ and $e$, which are electrically connected to binding-posts $f$ and $g$.

At B is a neutral relay having an armature $n$, which is normally spring-retracted by the spring $e$, which secures it to a suitable support at one end. This armature controls contact-points $m$ $n$.

C is an electrical annunciator or call of any approved pattern.

D is the battery or other source of electrical supply.

The circuit-connections are as follows: maximum circuit, from + pole of battery to $h$, to $a$, through mercury to maximum adjustable contact $i$, to $d$, to $f$, through annunciator C, to − pole of battery; minimum circuit, from + pole of battery to $h$, to $a$, through mercury to minimum adjustable contact $k$, to $e$, to $g$, to $q$, through coils of relay B, to $s$, back to − pole of battery; annunciator branch circuit, from + pole of battery to $x$, to $r$, through armature-lever $n$ and contacts $m$ $o$, to $p$, to $y$, through annunciator C, back to − pole of battery.

Suppose that it be desired to maintain the temperature between 100° and 50° Fahrenheit. In that event the maximum contact $i$ is set so that its point will be opposite the 100° mark on the scale, and the minimum contact $k$ is set so that its point will be opposite the 50° mark on the scale. Thus the minimum contact will be immersed in the mercury until the latter falls below the minimum point, while the maximum contact will be above the mercury until the latter reaches the maximum point. Under these conditions, so long as the temperature is above 50° and below 100°, the maximum circuit will be open and the minimum circuit will be closed, the relay B in this circuit consequently being energized, and thus holding open the annunciator branch circuit at $m\ n$, and the result is, that the annunciator C will remain inactive; but whenever the temperature increases sufficiently to cause the mercury to rise high enough to meet contact $i$ then the maximum circuit through the annunciator will be closed and the latter will ring. On the other hand, when the temperature falls below 50°, the mercury in the glass will stand below contact $k$, thus breaking the minimum circuit. Relay B consequently becomes inactive, the spring-retracted armature $n$ closes the branch annunciator circuit through contacts $m\ o$, and the annunciator is at once put in operation.

Having described my improvements and the best way now known to me of carrying the same into practical effect, what I claim herein as new and of my own invention is as follows:

1. The mercury-tubes and the adjustable maximum and minimum contacts, in combination with a normally-open maximum circuit, including the maximum contact and the mercury of its tube, a normally-closed minimum circuit, including the minimum contact and the mercury of its tube, and annunciator or indicator mechanism controlled by each circuit and brought into operation upon change in the condition of said circuit, substantially as and for the purposes hereinbefore set forth.

2. The mercury-tubes and the adjustable maximum and minimum contacts, in combination with a normally-open maximum circuit, including the maximum contact, the mercury of its tube, and the annunciator, a normally-closed minimum circuit, including the minimum contact, the mercury of its tube, and the coils of a relay, and a branch circuit through the annunciator containing contact-points controlled by the relay, substantially as and for the purposes hereinbefore set forth.

In testimony whereof I have hereunto set my hand this 29th day of August, 1888.

MAX MEYER.

Witnesses:
 SIEGMUND MEYER,
 A. L. AYRES.